United States Patent
Palatsi

[19]

[11] Patent Number: 5,892,475
[45] Date of Patent: Apr. 6, 1999

[54] USER INTERFACE FOR AN ELECTRONIC DEVICE

[75] Inventor: Mikko Juhani Palatsi, Turku, Finland

[73] Assignee: Nokia Mobile Phones, Ltd., Espoo, Finland

[21] Appl. No.: 880,584

[22] Filed: Jun. 23, 1997

[30] Foreign Application Priority Data

Jun. 28, 1996 [GB] United Kingdom ............... 9613684

[51] Int. Cl.⁶ .................................................. G06F 3/00
[52] U.S. Cl. ............................................................ 345/352
[58] Field of Search ................................. 345/352, 353, 345/356, 357, 123, 146

[56] References Cited

U.S. PATENT DOCUMENTS 5,258,748  11/1993  Jones ....................................... 345/172
5,363,481  11/1994  Tilt ............................................ 395/156
5,479,476  12/1995  Finke-Anlauff ............................ 379/58

FOREIGN PATENT DOCUMENTS

0557911 A1  9/1993  European Pat. Off. .
2241809     9/1991  United Kingdom .
2278756    12/1994  United Kingdom .

*Primary Examiner*—A. Katbab
*Attorney, Agent, or Firm*—Perman & Green, LLP

[57] ABSTRACT

A user interface comprising input means, and control means for determining whether a period of time of a predetermined duration has elapsed from a first operation of the input means, and responsive to another operation of the input means: if the other operation is detected within the period of time to cause an item to be made available for selection, or if the other operation is detected after the period of time has elapsed to cause an item to be selected. The user interface may be suitable for a telephone.

10 Claims, 2 Drawing Sheets

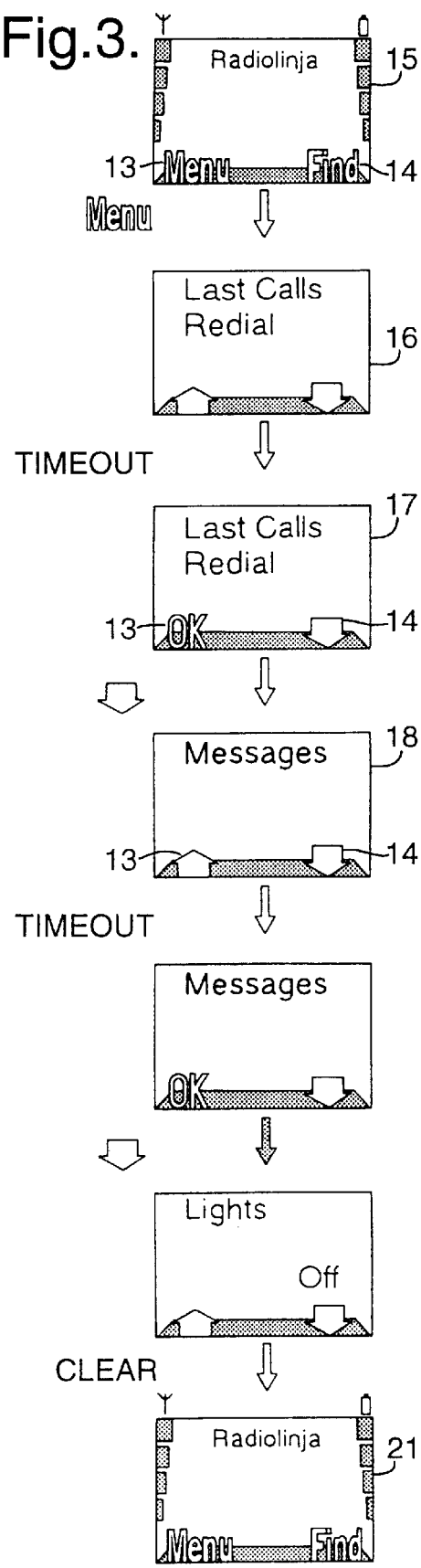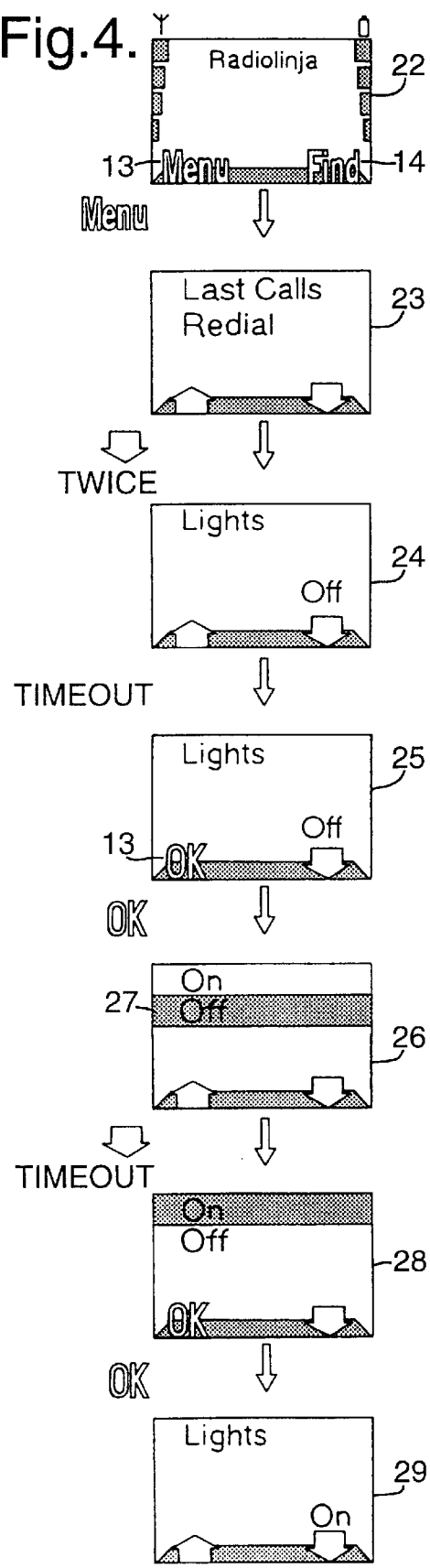

USER INTERFACE FOR AN ELECTRONIC DEVICE

BACKGROUND OF THE INVENTION

This invention relates to a user interface, especially a user interface for a portable telephone.

Many portable telephones are controlled through a series of menus. Each menu consists of a series of menu items which can be selected by a user. The selecting of an item controls the telephone, either to cause it to present another menu (for example if the menus are organised in a hierarchical, branching structure) or to control other features of the telephone (for example to begin a telephone call, store information in a memory or increase the telephone's ringing volume). Typically, three keys are provided to allow the user to operate the menu system. One key causes the next menu item to be displayed, another key causes the preceding menu item to be displayed, and the third key is used to select the currently-displayed item. This is a form of "scroll-and-select" menu system.

There is a need for portable telephones (especially hand-portable telephones) to be smaller, to make them more convenient to carry, and as they become smaller it is necessary to reduce the size of their keypads. However, this has the risk of making the telephones less easy to use; either because the keys are too small or, if fewer keys are used, because a more basic but less user-friendly control system has had to be adopted.

SUMMARY OF THE INVENTION

According to the present invention from one aspect there is provided a user interface comprising input means, and control means for determining whether a period of time of a predetermined duration has elapsed from a first operation of the input means, and responsive to another operation of the input means: if the other operation is detected within the period of time to cause an item to be made available for selection, or if the other operation is detected after the period of time has elapsed to cause an item to be selected.

The control means is preferably responsive to the first operation to cause an item to be made available for selection.

The input means preferably comprises at least a first input device and a second input device; and preferably the first operation can be an actuation of either of the input devices but the second actuation can only be an actuation of the first input device. Most preferably the control means is responsive to actuation of the second input device whether within the period of time or after the period of time has elapsed to cause an item to be made available for selection.

When an item is made available for selection it is preferably newly made available for selection, having not been available for selecting immediately before being made available.

The predetermined duration may be fixed, or definable by a user, or automatically determined by the user interface.

The user input means may comprise a plurality of binary input devices, having only two states: actuated and non-actuated. The devices could be pressure-sensitive devices.

The user interface preferably comprises output means operable under the control of the control means. The output means may be a visual display means. The output means may be used to indicate the function of at least part of the input means, preferably by displaying information in a zone associated with an input device of the input means. The zone may preferably be located relatively near the said input device.

The user interface may be the user interface of a portable electronic device. The user interface is preferably the user interface of a telephone.

BRIEF DESCRIPTION OF THE DRAWINGS

The present invention will now be described by way of example with reference to the accompanying drawings, in which:

FIGS. 3 and 4 illustrate the use of the user interface of the telephone.

DETAILED DESCRIPTION OF THE INVENTION

Figure 1:
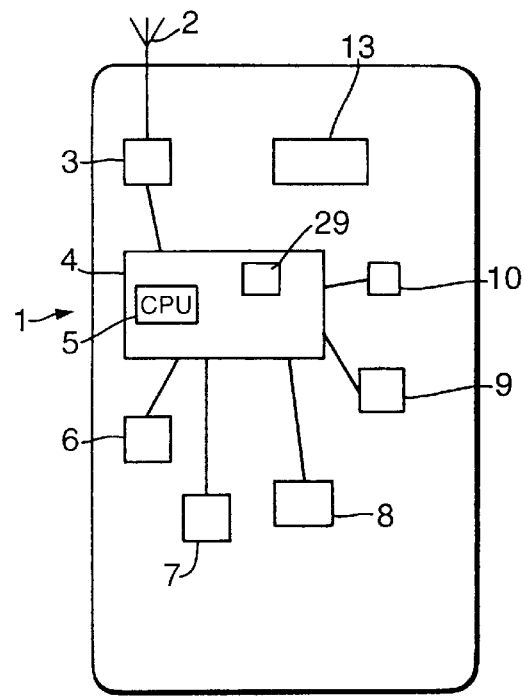
FIG. 1 is a schematic block diagram of a telephone.
Figure 2:
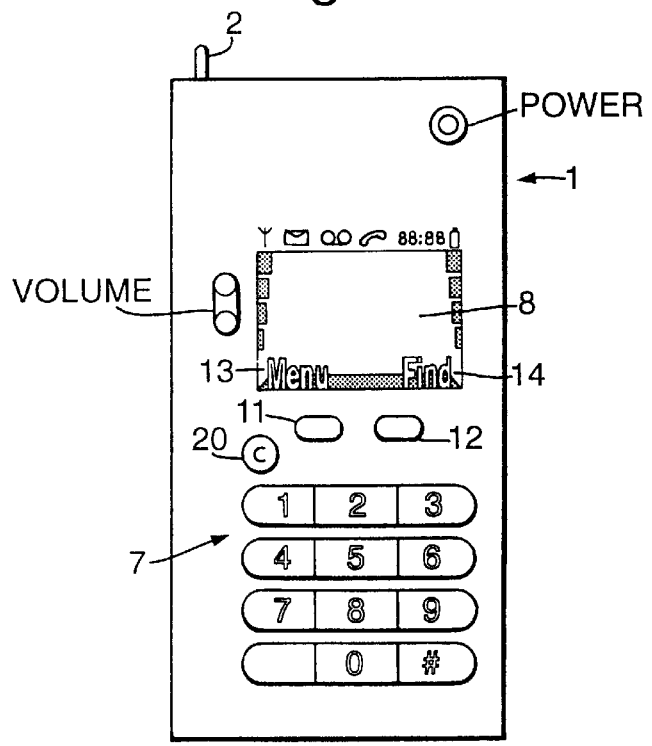
FIG. 2 shows the front of the telephone of FIG. 1.

The portable telephone 1 shown in FIGS. 1 and 2 has an antenna 2 connected to a radio transceiver unit 3. A digital processing section 4 including a processor 5 is connected to: the transceiver unit, a memory 6 for storing data for use by the processor (including program information, the current settings of the telephone and user-defined information such as frequently used telephone numbers), a keypad 7 for providing input to the processor, an LCD display 8 controlled by the processor, a microphone 9 and a speaker 10. The keypad 7 has at least two "soft" keys 11, 12. A battery 13 is the source of power for the telephone. The telephone can make telephone calls by radio to a cellular telephone network in the normal way.

The user interface of the telephone is defined by, for instance, the layout and surface marking of the keys, the appearance of the display, and the way in which the telephone responds to key presses. The functions of the "soft" keys vary from time to time. The current functions are indicted by corresponding soft key zones 13,14 of the display. One soft key zone is associated with each soft key. The two soft keys are located close together to minimise finger movement when using those keys.

Certain functions of the telephone are controlled from time to time by a scroll-and-select menu system. When a scroll-and-select menu is in operation the user can scroll through the menu items and then select the desired one. In a conventional telephone this would be done using the dedicated arrow keys and a "select" key. However, the telephone shown in the figures has none of these keys.

FIGS. 3 and 4 illustrate the operation of the telephone by showing a series of pictures of the telephone's display in successive modes, as a user moves through the menu structure. The columns at the left of each figure show the actions taken to move from each display to the next. Referring to FIG. 3, the display of the telephone in the initial "base" or "idle" mode is shown at 15. This is how the display might appear immediately after the telephone has been turned on. Soft key 11 is marked "Menu" (in the corresponding zone 13 of the display) and soft key 12 is marked "Find" (in the corresponding zone 14 of the display). By pressing soft key 12 the user causes the telephone to enter a scroll-and-select menu mode (shown at 16).

In the illustrated example the first menu level of the menu structure includes the following items: "Last Calls Redial", "Messages" and "Lights". Initially the item "Last Calls Redial" is displayed (as shown at 16). Initially in the scroll-and-select menu mode the soft keys are marked by up and down arrows in the soft key zones and can be used to scroll through the menu options. Pressing key 11 causes the menu item preceding the currently-displayed one to be displayed; pressing key 12 causes the succeeding item to be displayed (as illustrated at 17). The processor of the telephone monitors the time period since either of the soft keys was last pressed. When a certain set time has elapsed (the timing will be discussed in more detail below) the soft key zone 13 corresponding to key 11 changes to display "OK" (as shown at 17). Pressing key 11 will then select the currently-displayed menu item and cause the processor to take the appropriate action corresponding to that item—for instance to move to the next menu level, whereupon the process can be repeated. Alternatively, pressing key 12 (still marked by a down arrow at 14) will still cause the succeeding menu item to be displayed and also cause the processor to restore the up arrow function to key 11 and change the corresponding zone 13 of the display (as shown at 18). Pressing and holding the "clear" key 20 (in FIG. 2) returns the telephone to the base mode (as illustrated to reach display 21). Pressing the "clear" key 20 briefly moves to the next higher menu level.

FIG. 4 shows another example starting from the base mode. The user presses key 11 (marked "Menu" at 13) to move from the base mode (at 22) to the first scrolland-select menu (at 23). The user then presses the down arrow key 11 twice, without the set period elapsing between presses, to cause the "Lights" menu item to be displayed together with the current setting of that item: "Off", (at 24). The user then pauses and when no further keys have been pressed within the set period the processor causes the display to change to display "OK" in soft key zone 13 (at 25). The user then presses key 11 to select the currently-displayed menu item: "Lights", and moves to the next scroll-and-select menu level in which the menu items are "On" and "Off" (at 26). A reversed bar 27 highlights the current setting of the option ("Off"). As before, the user can use the soft keys marked by arrows to scroll between the items. In this menu, scrolling causes the reversed bar to scroll or swap between the two menu items. In the illustrated example the user presses hot key 12 to move the reversed bar to indicate "On" and then pauses so that "OK" is displayed against key 11 (at 28). The user then presses key 11 to select menu option "On". In this case, no lower menu levels lead from the "On" item so the display returns to the next higher menu level (at 29).

It could be the function of the other scrolling key 12 which switches when the set period elapses. It is preferred that it is always the same one of the keys whose function switches—this encourages a user to normally scroll in the direction provided by the other one of the keys.

The timing of the period since a user last pressed a key will now be discussed in more detail. The time allowed before the function of key 11 switches from "up arrow" to "OK" (the "function delay") should be sufficient to allow the user time to scroll freely through the menu items but not so long that it is obtrusive and unnecessarily delays the user being able to select a menu item. The function delay could be fixed or could be definable by a user; for example a scroll-and-select menu of the telephone could allow the user to choose from long, medium and short function delays, corresponding to, for instance, 3, 2 and 1 seconds. Alternatively the telephone could adapt the function delay to the user, for example by measuring the periods between successive presses of soft keys to scroll through menu items and processing these data to generate a value for the function delay. For example the function delay could be a multiple (for example 1.5, 2 or 3) of the mean period between scrolling key-presses. In case a user does not want to wait until the function delay expires, the pressing of another key could also trigger the function of key 11 to switch.

When a key is pressed that has the effect of entering the scroll-and-select menu mode or when a key is pressed to scroll between menu items (for example pressing the soft key 11 at 15 or 23 the processor 3 starts a timer 29 (in FIG. 1). If another key press is detected before the necessary time has passed then the processor acts on the key press appropriately (if possible) and then resets the timer and starts it again. When the timer indicates that the necessary time has passed the processor alters the soft key zone 13 of key 11. In other modes of the telephone the function of the keys may be independent of the timer. The resetting of the timer could be caused by any of the keys of the telephone or only a subset of those keys—for instance only keys 11 and 12.

The keypad may be a membrane keypad or any other suitable unit. The display may be a matrix LCD (liquid crystal display) unit or any other suitable unit. Rather than having one or more keys as the input means the telephone could have, for example, one or more touch sensors, sound sensors (actuated by sound) or motion sensors (actuated by motion/acceleration) and/or proximity sensors. Each input device is preferably a binary input device having two states: actuated and not actuated.

The telephone could indicate items for selection by, for example, displaying the item individually or moving a cursor from one item to the next or highlighting successive items or scrolling the menu items relative to a cursor.

The user interface could be applied to other devices, especially portable electronic devices. The invention is particularly useful for portable and/or cellular and/or radio telephones.

In view of the above description it will be clear to a person skilled in the art that various modifications may be made within the scope of the invention. The invention may include any novel features or combinations of features disclosed herein either explicitly or implicitly and any generalisations thereof irrespective of whether they relate to the invention as claimed or mitigate any of the problems addressed by the invention as claimed.

What is claimed is:

1. A user interface comprising input means, and control means for determining whether a period of time of a predetermined duration has elapsed from a first operation of the input means, and responsive to another operation of the input means:

if the other operation is detected within the period of time to cause an item to be made available for selection, and if the other operation is detected after the period of time has elapsed to cause an item to be selected.

2. A user interface as claimed in claim 1, wherein the control means is responsive to the first operation to cause an item to be made available for selection.

3. A user interface as claimed in claim 1, comprising output means for indicating the function of the input device, and wherein the control means causes the function indicated by the output means to change when the period expires.

4. A user interface as claimed in claim 1, wherein the input means comprises at least a first input device and a second input device, the first operation is an actuation of either of the input devices and the second actuation is an actuation of only the first input device.

5. A user interface as claimed in claim 4, wherein the control means is responsive to actuation of the second input device whether within the period of time or after the period of time has elapsed to cause an item to be made available for selection.

6. A user interface as claimed in claim 1, wherein the item is a menu item.

7. A user interface as claimed in claim 1, wherein the item is made available for selection by a user.

8. A user interface as claimed in claim 1, wherein each said item made available for selection differs from any item available for selection immediately previously.

9. A user interface as claimed in claim 1, wherein the predetermined duration is configurable by a user.

10. A user interface as claimed in claim 1, wherein each input device is a binary user input device.

\* \* \* \* \*